July 18, 1944.  H. F. H. SHIELDS  2,353,972
APPARATUS FOR LOADING WHEELED VEHICLES AND
STOCKING-OUT MATERIAL UNLOADED THEREFROM
Filed Feb. 10, 1943  8 Sheets-Sheet 2
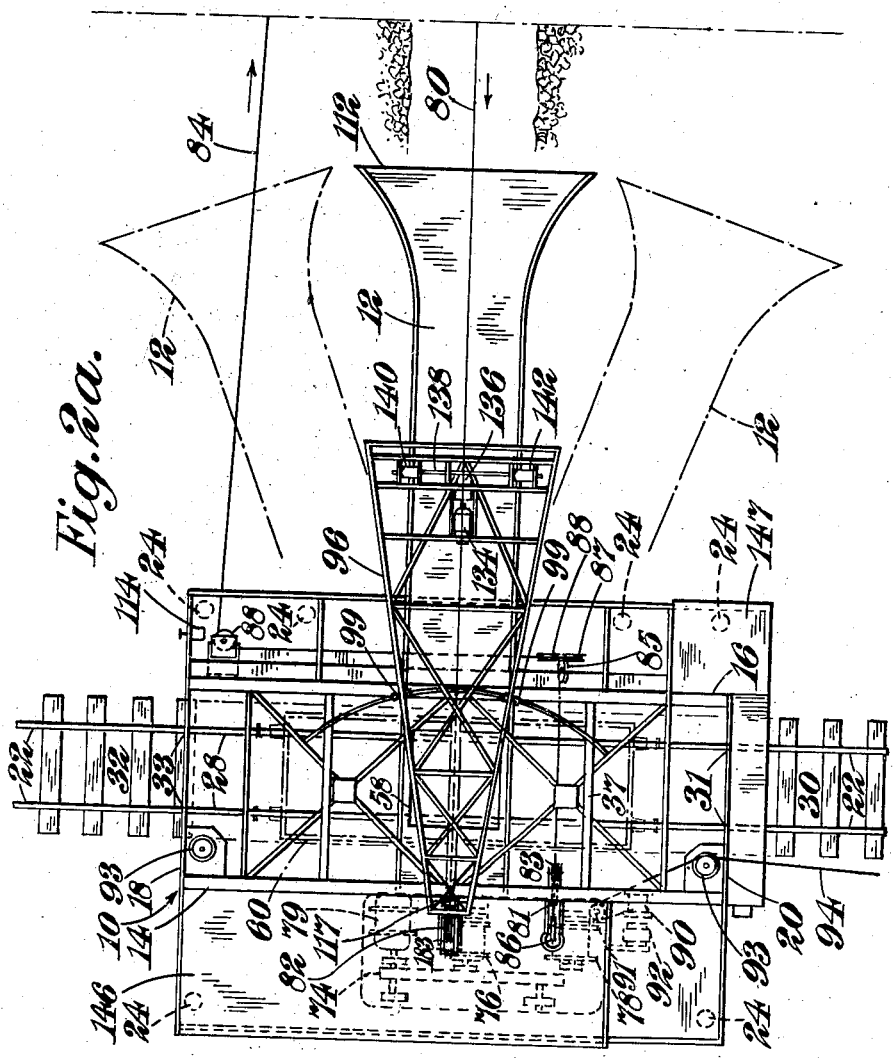
Inventor
H. F. H. Shields
by
Young, Emery + Thompson
Attys July 18, 1944.  H. F. H. SHIELDS  2,353,972
APPARATUS FOR LOADING WHEELED VEHICLES AND
STOCKING-OUT MATERIAL UNLOADED THEREFROM
Filed Feb. 10, 1943   8 Sheets-Sheet 3
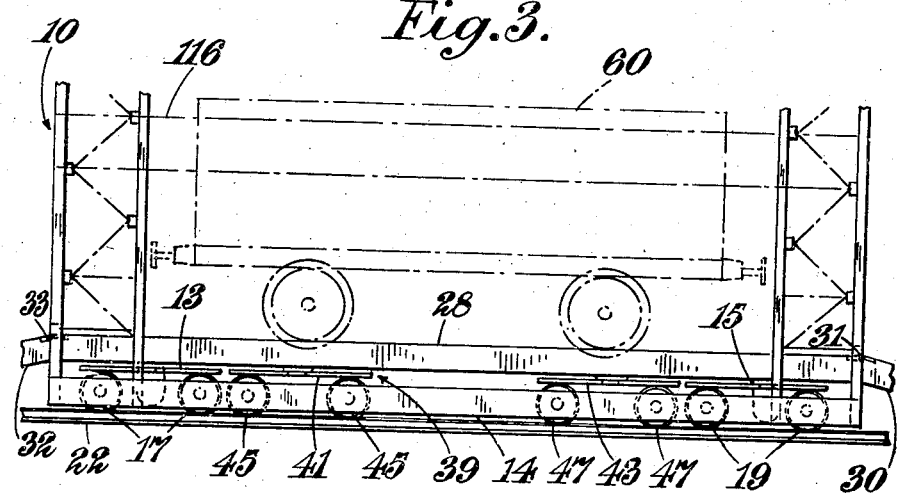
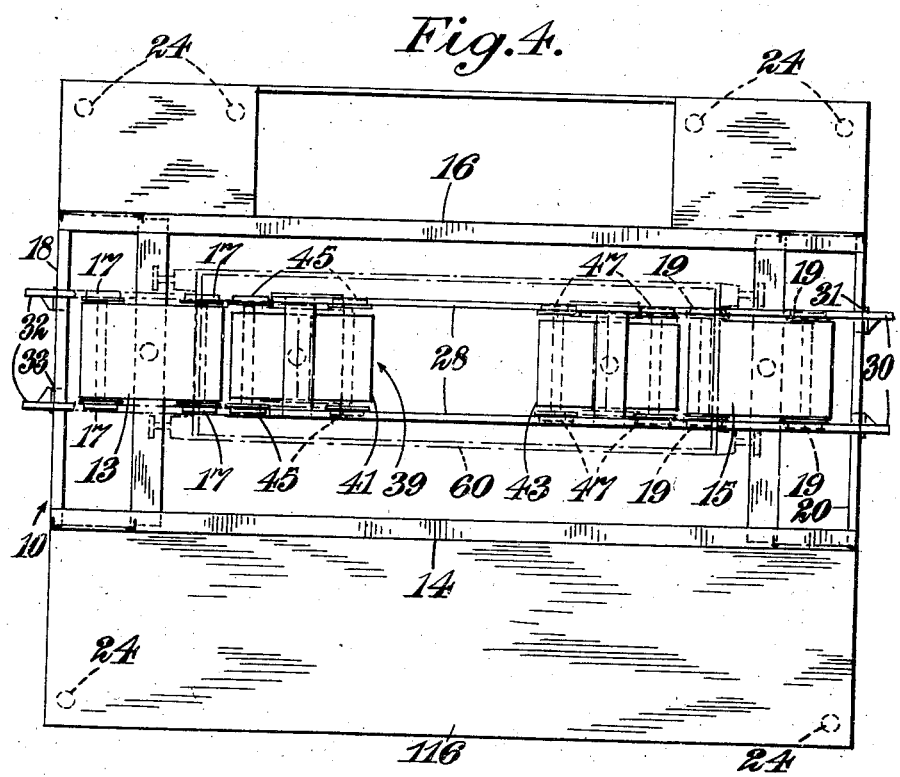
Inventor
H. F. H. Shields
by Young, Emery & Thompson
attys

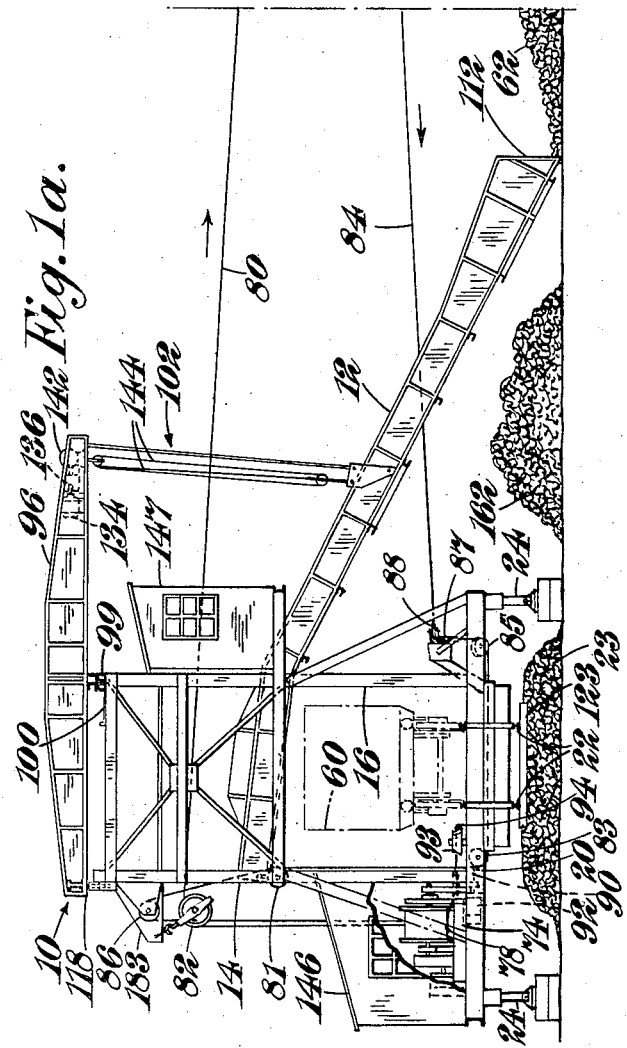

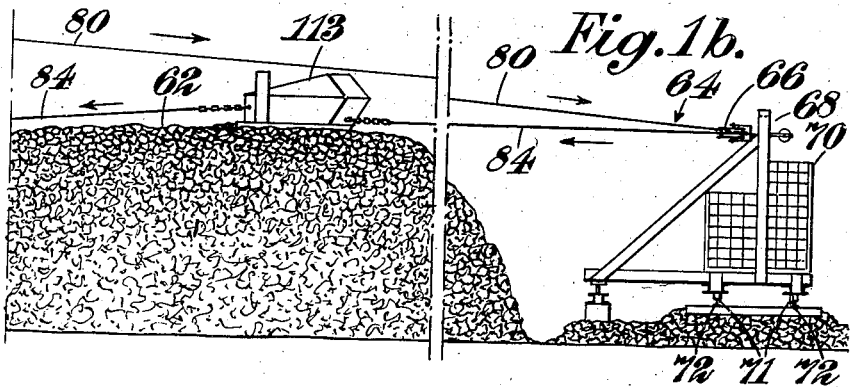

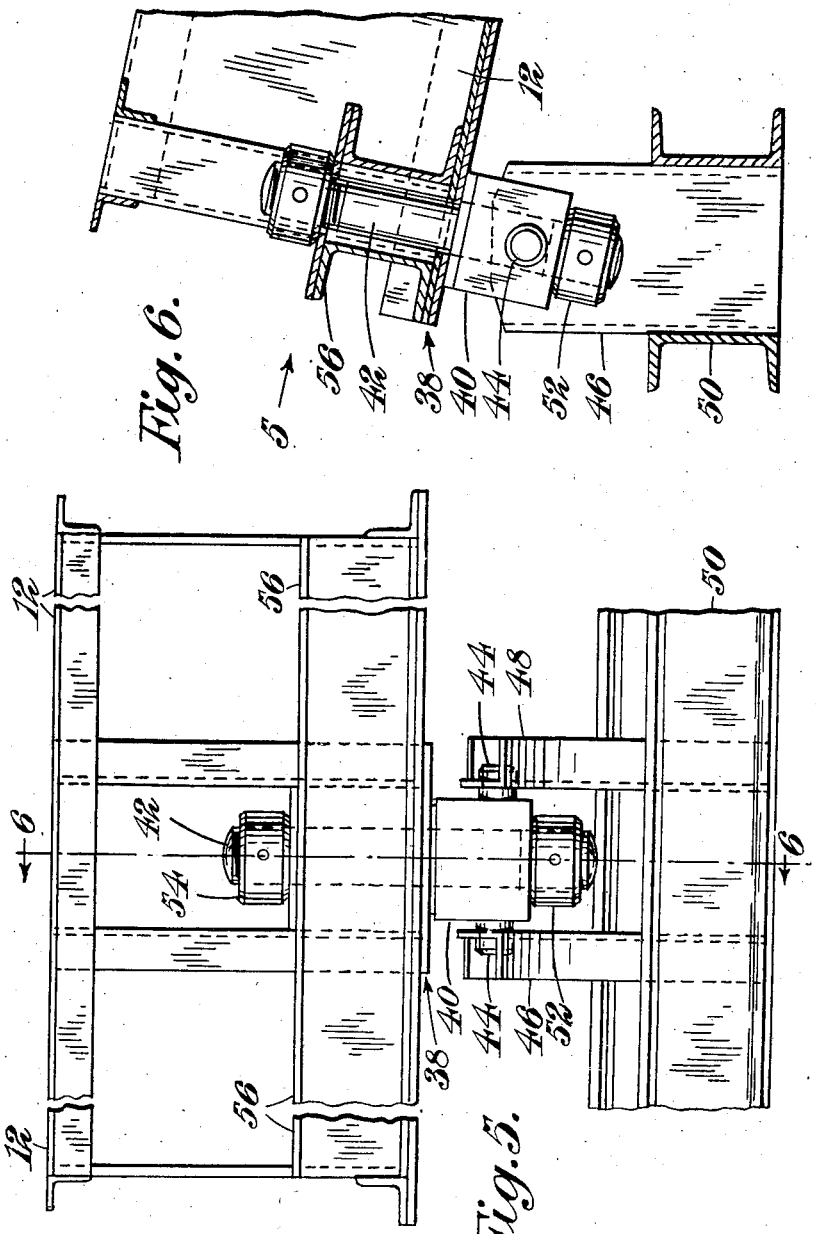

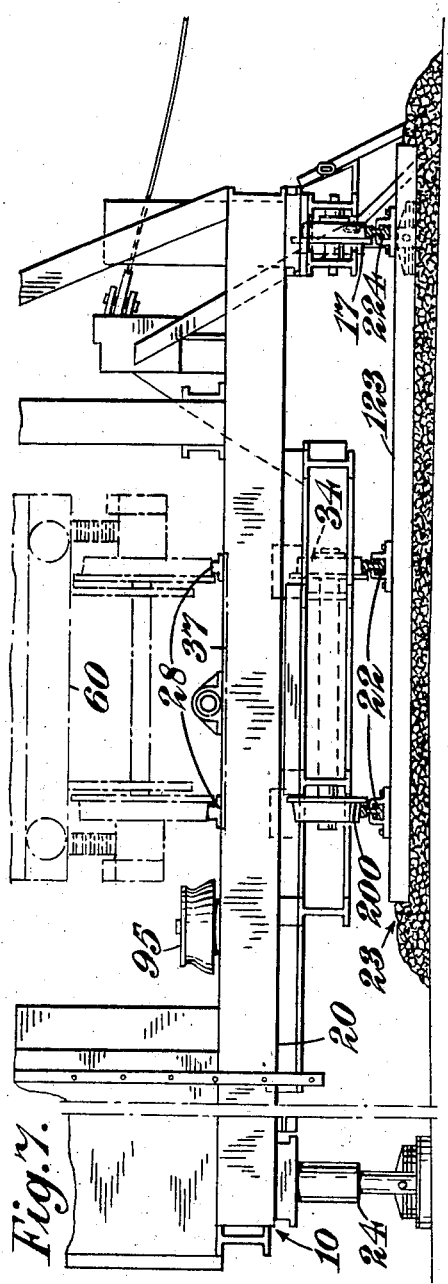
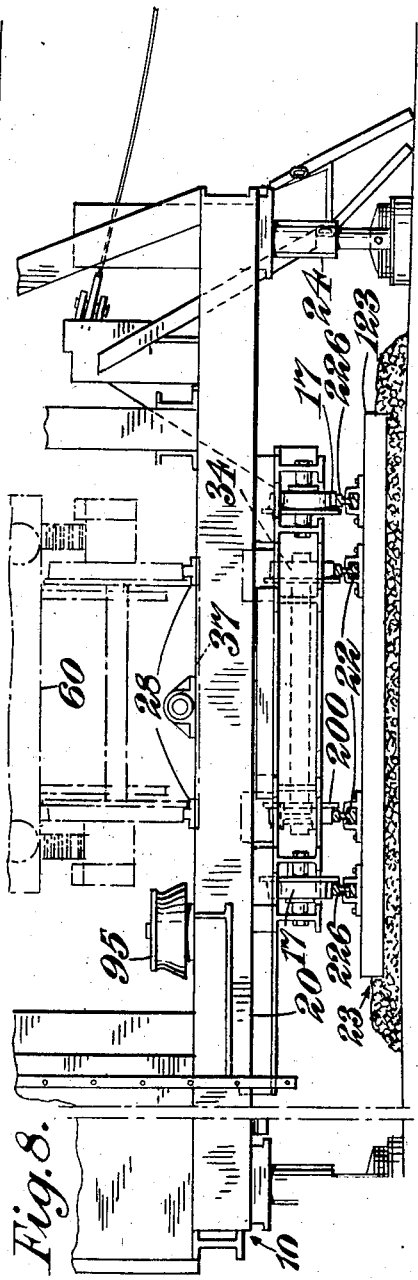

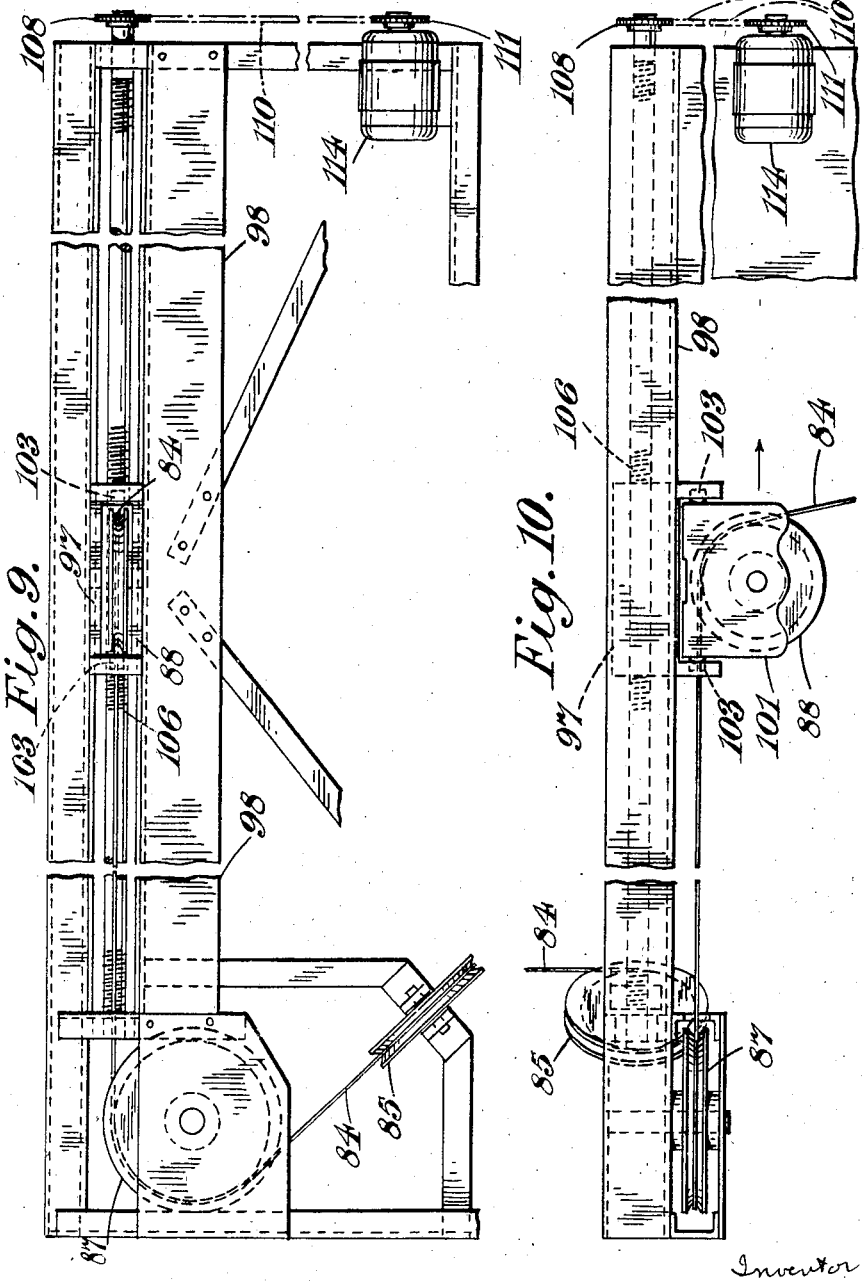

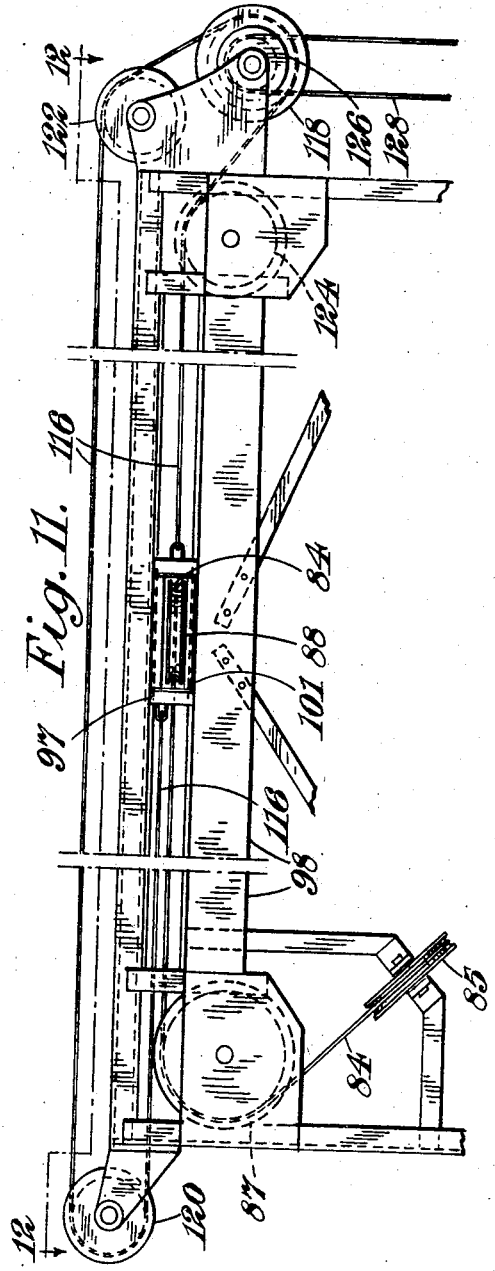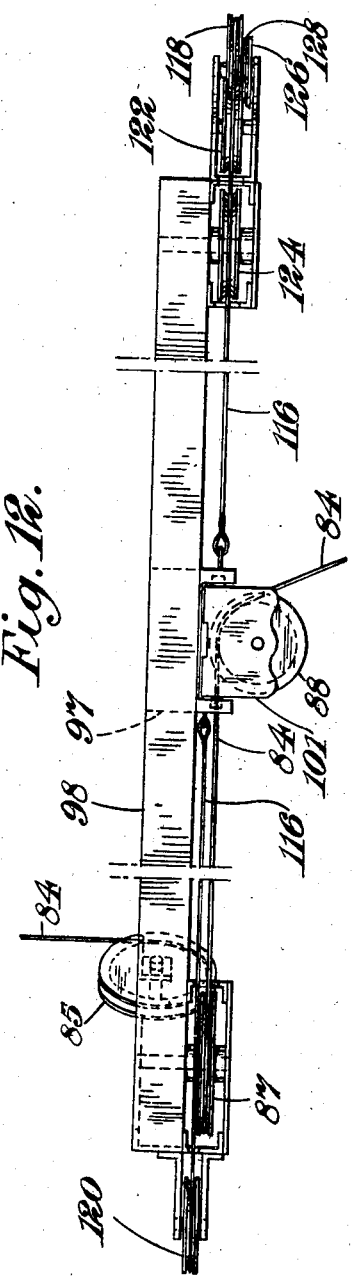

Patented July 18, 1944

2,353,972

UNITED STATES PATENT OFFICE 2,353,972

APPARATUS FOR LOADING WHEELED VEHICLES AND STOCKING-OUT MATERIAL UNLOADED THEREFROM

Herbert Frederick Henry Shields, London, England

Application February 10, 1943, Serial No. 475,422
In Great Britain February 10, 1942

10 Claims. (Cl. 214—110)

This invention relates to apparatus of the drag scraper type for use in loading wheeled vehicles, such as railway wagons, with fragmentary material of various kinds, such as coal, gravel and the like, or for use in stocking-out such material, hereinafter referred to generally as coal, removed from loaded wheeled vehicles, or for both said uses. The invention also relates to methods of loading wheeled vehicles with coal, and stocking-out coal from loaded wheeled vehicles, by means of apparatus of the drag scraper type.

In plant used heretofore for reclaiming coal from dumps a travelling loader of the drag scraper type has been arranged to run on one pair of rails of a rail-track, and the coal wagons have run towards and away from the loader on an adjacent pair of rails of a second track, in order that the loader when not in use, should not interfere with the running of the coal wagons on their track. Similarly, if the plant was also used for making dumps for the purpose of stocking the coal, the loaded coal wagons were run on one pair of rails to a fixed unloading station where they were unloaded, and travelling apparatus of the drag scraper type ran on a second independent pair for stocking-out the unloaded coal.

It is an object of the present invention to obviate the necessity of providing two distinct tracks spaced laterally away from one another, one for the loading or stocking-out apparatus of the drag scraper type, and the second for the wagons, and to provide an improved construction of such apparatus for use in reclaiming and stocking-out coal.

According to a feature of the invention there is provided apparatus for use in loading wheeled vehicles, or for use in stocking-out coal removed from loaded vehicles, or for both said uses, comprising a main frame that is arranged to travel along a ground track, in combination with a pair of rails constituting an upper track that is arranged to lie above and travel on the ground track, and has end portions constituting ramps that slope downwards to rails on the ground track. The upper track will be relatively short, and when used for loading of stocking-out coal the two tracks are arranged in superposed relation, as the wagons to be loaded or unloaded will always pass on the upper track; the space between this and the ground track may be used for accommodating part of the main frame, and if necessary the main frame may travel on the same rails on the ground track as the upper track. As compared with the former lay-out with the two ground rail-tracks arranged laterally spaced apart one from another, the improved arrangement results in a very considerable saving in cost in laying out the plant, and also enables improved methods of operating the plant, as described hereinafter, to be used.

The main frame is preferably of arched construction, and the upper track preferably extends through it.

The mobile main frame may be arranged to travel either on the same rails on the ground track as does the upper track, or on one of these rails and on a third rail on the ground track, or on a pair of rails on the ground track wider or narrower than those of the upper track.

The upper track may be carried wholly or partly by the main frame, and if desired a middle portion of it may be carried by a wheeled truck arranged to run on the ground track.

According to another feature of the invention, in loading apparatus of the drag scraper type as set forth above having a coal ramp pivotally mounted on the main frame above the upper track, provision may be made for slewing and lifting the coal ramp by means comprising an universal joint device, as described hereinafter, preferably situated at or near one end of the coal ramp.

Conveniently a jib adapted to be slewed on the main frame is provided with lifting means for raising and lowering the coal ramp.

Power-operated means for actuating the drag scraper, for moving the coal ramp, and for driving the main frame along the ground track may be mounted on the main frame and form an unitary structure therewith.

Other features of the invention relate to means for lifting the coal ramp, and to means for traversing the back-haul rope of a scraper bucket across the front of the main frame.

The invention also provides a method of loading wheeled vehicles with coal by means of a mobile apparatus of the drag scraper type arranged to run on a rail-track, and a method of stocking-out coal from loaded wheeled vehicles by means of a mobile apparatus of the drag scraper type as described hereinafter.

One embodiment of the invention, and modifications thereof, are diagrammatically illustrated by way of example in the accompanying drawings, wherein:

Figures 1a and 1b are side elevations showing one construction of apparatus according to the invention comprising an upper track for use in loading wheeled vehicles and stocking-out material contained in loaded wheeled vehicles, and Figures 2a and 2b are corresponding plan views thereof;

Figure 3 is an elevation showing a modified construction of part of the apparatus comprising a wheeled truck supporting the middle portion of the upper track, and Figure 4 is a plan view of the parts shown in Figure 3;

Figures 5 and 6 are respectively end elevation, and vertical section taken on the line 6—6 in Figure 5, showing an universal joint connecting a coal ramp with a main frame of the apparatus;

Figures 7 and 8 are sectional end elevations showing two modified arrangements of rails on a ground track, on which the loader runs;

Figures 9 and 10 are, respectively, detail plan view, and front elevation, showing one form of mechanism for traversing on the main frame a pulley round which the back-haul rope of the drag scraper device passes, and Figures 11 and 12 are, respectively, detail plan view, and front elevation, showing a modified construction of traversing mechanism for the movable pulley of the back-haul rope.

Like reference characters designate like parts throughout the several views.

Referring to the drawings, apparatus of the drag scraper type for loading railway wagons comprises a loader having a gantry-like main frame, designated generally 10, of arched construction, a coal ramp 12 pivotally mounted as described hereinafter on the main frame, and a drag scraper 113 in the form of a bucket for either scraping the material into the ramp, or conveying it away from the loader to form a dump. This frame 10 which is rectangular as viewed in plan and in end elevation, and has two longitudinal sides 14, 16, and two ends 18, 20, has two swivelling bogies 13, 15, respectively provided with wheels 17, 19, arranged to run on rails 22 of a ground track 23 comprising sleepers 123, on which rails 22 empty and loaded wagons can run to, through and from the loader as described hereinafter. Levelling and load-distribution means in the form of hydraulic or manually-operable jacks 24 may be provided at the ends of the frame 10, and/or if desired along one or both sides thereof, for distributing the load when working and for levelling the main frame.

The loader frame 10 is provided with a short upper track having a middle portion 28, and two end portions 30, 32 constituting ramps that are hinged or pivoted respectively, preferably so as to swing about horizontal and vertical axes, at 31 and 33 to the middle portion 28 and slope downwards to the rails 22 of the ground track 23. This upper track 28, 30, 32, which is the same gauge as the rails 22, may be carried on end transverse girders 18, 20 of the frame 10, as well as on other transverse beams 37 situated between the ends of the frame.

Alternatively, as shown in Figures 3 and 4, the middle portion 28 of the upper track may be carried by a wheeled truck 39, which may be either coupled at its ends to, or be free in the main frame, has two swivel bogies 41, 43 with wheels 45, 47, respectively, arranged to run on the rails 22 of the ground track 23. Owing to the loader frame 10, and the truck 39 being provided with swivel bogies they are both well adapted for passing over railway points and crossings, and travelling round curves.

The coal ramp 12 is mounted on the frame 10 by means comprising an universal joint designated generally 38, described hereinafter, so as to swing up and down, and also laterally, from a central position shown in full lines in Figure 2a, towards opposite sides to lateral positions indicated in broken lines in that figure. As shown in Figures 5 and 6, this universal joint 38 comprises two elements 40, 42 rotatable at right angles to one another. The element 40 in the form of a rectangular block is rotatable about a horizontal axis and has two trunnions or pivots 44 journalled in two upright bearing brackets 46, 48 carried by a frame member 50. The element 42, which has the form of an axle having collars 52, 54 keyed on its opposite ends, is rotatable in the element 40 and extends through a transverse member 56 at the upper end portion of the coal ramp 12, which member 56 lies at the side of the frame 10 remote from the mouth 112 of the coal ramp.

The coal ramp 12 has an outlet 58 (see Figure 2a) in its upper portion which is situated within the frame 10 and lies at an obtuse angle to the lower portion of the ramp, which outlet 58 serves for delivering the material to an empty wagon indicated in broken lines at 60 on the upper pair of rails 28. The lower portion of the coal ramp 12 is flared to form the mouth 112, and in some cases this mouth portion may be hinged to swing vertically away from and towards the ground, so as to move out of the way when the scraper bucket 113 is being used for conveying coal unloaded from the wagons to a dump 62.

The bucket 113 is attached by chains at the front and rear to a haulage rope designated generally 64. This rope, which is driven by power-operated means on the loader described hereinafter, is led around two sheaves 66 that are supported on a travelling tail tower 68, which may carry concrete ballast indicated in broken lines at 70, and has wheels 71 arranged to travel along rails 72. The power-operated means for driving the rope 64 comprises a winch 74 having two drums 76 and 78 driven by an electric motor 79. Assuming that, as illustrated in Figures 1a and 2a, an empty wagon 60 is being loaded, the in-haul run 80 of the rope passes over a central sheave 82 in a block slung from a bracket 183 on the rear of the frame 10, and is connected to the drum 76. The back-haul run 84 which has its end connected to the back-haul drum 78, passes from the latter up and down over a pulley 86, over a pulley 81 to two pulleys 83, 85 at one end of the frame 10, and then round two pulleys 87, 88 spaced apart on the front of the frame at opposite sides of the centre thereof below the coal ramp 12 in its elevated position, which pulley 88 is journalled in a bearing bracket 97 that may be fixed on, or movable along a supporting member 98 in the form of a beam on the front of the frame 10. By driving the drums 76 and 78 in the appropriate direction, the scraper bucket 113 can be hauled in both directions, either when reclaiming by scraping coal from the dump 62 up the ramp 12 for delivery through its outlet 58 to a wagon 60 as shown in Figures 1a to 2b, or when stocking-out by conveying coal to form the dump 62 from coal that has been removed from a loaded wagon on the middle portion 28 of the upper rails to form a heap 162 at the front side of the frame 10. Such a loaded wagon 60 situated on the upper rails 28 may be unloaded in any convenient manner, for example by hand, or by unloading means described in the British Patent Specification No. 1,765/42 (Serial No. 558,181), but such unloading means do not form part of the present invention.

When using the described apparatus for stocking-out, the coal 12 will be elevated, and the scraper bucket 113 will have its chains attached to the back-haul run 84 of the rope; to enable the bucket to remove the coal from various parts of the heap 162 along its length at the front side of the main frame, the pulley 88 is so mounted that it can be traversed along the front side of the main frame.

As shown in Figures 9 and 10, the movable pulley 88 is journalled in a U-shaped member 102 which is itself pivoted at 103 in the arms of the U-shaped bearing bracket 97 so that the pulley 88 is movable about two axes situated at right angles one to the other. The bearing bracket 97 is mounted on a screw-threaded spindle 106 which is journalled on the beam 98 that extends along the main frame 10 at a situation below the coal ramp 12 when the latter is in its elevated position. This spindle 106 may be arranged to be rotated manually, but, as illustrated, one end carries a sprocket wheel 108 connected by an endless chain 110 with a driving sprocket 111 driven by a motor 114. The back-haul rope 84 after passing round the pulley 88 is led round the end pulley 87, and the pulleys 85, 83, 81 and so to the back-haul drum 78 of the winch 74.

Figures 11 and 12 show a modified arrangement of traversing means for the pulley 88, in which the bearing bracket 97 slidable along the support 98 is arranged to be moved mechanically by a member 116, such as a chain or rope, which passes round two end pulleys 118 and 120 at the ends of the support 98, and two idler pulleys 122, 124, and has its ends attached to opposite sides of the bearing bracket 97. The pulley 118 may be driven by a coaxial sprocket wheel 126 and a chain 128 by means of a motor, as described above with reference to Figures 9 and 10, for shifting the pulley 88 along the front of the main frame.

Power-operated means comprising a capstan 90 (see Figure 2a) driven by an electric motor 92 is provided for moving the loader along the ground track 22 by means of a capstan rope 94 having its end anchored at any convenient position. This rope 94 passes round a pulley 91 and round one of two other pulleys 93, 95 at opposite ends of the frame 10 according to the direction of travel of the entire machine.

Means for lifting and lowering the coal ramp 12 comprises a central jib 96 mounted on the top of the frame 10. This jib, which is substantially triangular as viewed in plan, and has one end pivoted at 117 to swing about a vertical axis at the top of the rear of the frame 10, is supported between its ends by wheels 99 on an arcuate rail 100, and carries at its outer end lifting gear designated generally 132. This lifting gear may be driven by an electric motor 134 on the outboard end of the jib 96 which drives, by means of reduction gearing 136, a shaft 138 carrying two drums 140, 142 each provided with a set of block-and-pulley tackle 144, one set at each side of the coal ramp 12. In some cases, however, manually operable block-and-pulley tackle may be used for lifting and lowering the coal ramp. The coal ramp 12 and the jib member 96 can be slewed manually from their central position to a lateral position at either side thereof through an angle of about 45°. Alternatively, power-driven means may be provided for slewing the coal ramp and jib.

The power means comprising the winches 74 and 78 is accommodated in a power house 146 on a platform at the rear of the frame 10, while a cabin 147 on an elevated platform at the front side of the frame 10 contains the controls of the drag-scraper winch 74 operating the scraper bucket 113, the controls of the jacks 24, if operated hydraulically, and controls of the electric motor 134, if provided, for lifting and lowering the coal ramp 12, and the controls of the electric motor 114, if provided, for traversing the pulley 88 of the back-haul run of the drag-scraper rope.

In the construction described above the main frame 10 is arranged to travel on the same rails 22 of the ground track as does the upper track 28, 30, 32, but in some cases the rails of the ground track on which the main frame 10 travels need not be the same gauge as the upper track. Figure 7 shows such a modified arrangement, in which the main frame 10 travels on one of the same rails 22 of the ground track as does the upper track, and on a third rail 224 on the ground track, the ground rail-track on which the main frame runs being of wider gauge than the ground rail-track 22, on which the upper rail-track 28, 30, 32 runs. This arrangement provides a wider wheel base for the main frame 10 with the attendant advantages thereof.

Alternatively, as shown in Figure 8, the rail-track 22, on which the upper track 28, 30, 32 travels, may be distinct from, and of narrower gauge than a parallel pair of rails 226 of the ground track, on which the wheels 17 of the main frame 10 run. In some cases, the main frame may be arranged to travel on a pair of ground-track rails which lies between and is of narrower gauge than the rails of the upper track, but this arrangement is not preferred.

When the described apparatus is to be used for loading empty railway wagons, they will be run successively up either sloping ramp 30 or 32 to a loading position on to the upper rails 28 for receiving through the opening 58 in the lowered ramp 12 coal that has been conveyed up the latter by the scraper bucket 113, and the loaded wagons can then run on to the ground track at the opposite end of the frame from the loading position. When the described apparatus is to be used for stocking-out coal from loaded wagons on the upper rails 28, they will be run in succession along the ground rails 22 to an unloading position on the upper track, whereupon they will be unloaded in any convenient manner to form the temporary heap 162 at the front side of the frame, and the coal forming the heap will be scraped away by the bucket 113 to form the dump 62 while the coal ramp 12 is lifted out of the way of the bucket, the empty wagons being then run away from the unloading position along the ground rails 22. The invention thus provides a method of loading wheeled vehicles with coal by means of the described apparatus of the drag scraper type arranged to travel with a portion of rail-track, on which the empty vehicles to be loaded and the loaded vehicles are also run, and also a method of unloading wheeled vehicles containing coal to form a heap at the side of the described travelling apparatus of the drag scraper type arranged to travel with a portion of a rail-track, on which the loaded vehicles to be emptied and the emptied vehicles run on the same track. It will be appreciated that when loading or stocking-out coal, the described travelling apparatus forms no obstruction to the transit of either empty or full wagons along the rails 22 of the ground track when the described apparatus is not being used for either of these loading or unloading operations, although only one ground track is provided for the empty and full wagons.

Various modifications may be made in the details of construction described above without departing from the invention. For example, the outlet opening 58 in the upper part of the ramp may constitute the mouth of a hopper device which extends below it towards the upper track on the frame 10.

I claim:

1. Apparatus of the character described for use in loading wheeled vehicles with fragmentary material, comprising in combination a main frame arranged to travel along a ground track, an upper rail track that is arranged to lie above the ground track, and has end portions constituting ramps that slope downwards to rails on the ground track, and means of the drag-scraper type for loading vehicles situated on the upper track with fragmentary material, which means comprises a loading ramp that is pivotally mounted on the main frame to rock vertically and horizontally about two axes of pivoting that lie transversely one of the other at a situation offset from the central longitudinal vertical plane of the main frame.

2. Apparatus of the character described for use in loading wheeled vehicles with fragmentary material, and for use in stocking-out fragmentary material removed from loaded vehicles, comprising in combination a main frame arranged to travel along a ground track, an upper rail track that is arranged to lie above the ground track, and has end portions constituting ramps that slope downwards to cooperate with rails on the ground track, and means of the drag-scraper type comprising a loading ramp that is pivoted on the main frame above the upper track to swing about the horizontal axis of pivoting, for loading vehicles situated on the upper track with fragmentary material, a jib mounted on the main frame above the loading ramp, and lifting means carried by the jib arranged to raise and lower the loading ramp.

3. Apparatus as set forth in claim 2, wherein the lifting means comprises an electric motor, and lifting tackle operable thereby mounted on an outboard portion of the jib.

4. Apparatus as set forth in claim 2, wherein the lifting means comprises two sets of lifting tackle carried by the jib and connected to the loading ramp at opposite sides thereof, an electric motor on the jib, and gearing arranged to be driven by the motor and to drive both sets of tackle in unison.

5. Apparatus of the character described for use in loading wheeled vehicles with fragmentary material, and for use in stocking-out fragmentary material removed from loaded vehicles, comprising in combination a main frame arranged to travel along a ground track, an upper rail track that is arranged to lie above the ground track, and has end portions constituting ramps that slope downwards to cooperate with rails on the ground track, and means of the drag-scraper type for stocking-out fragmentary material that has been unloaded from vehicles situated on the upper track, which means comprises a power-driven rope, a drag-scraper device attached thereto, a pulley that is mounted to move bodily on the main frame and has a back-haul run of the rope passing round it, and means for traversing the pulley on the main frame in a direction lying transversely of the direction of length of that portion of the back-haul run of the rope which lies between the drag-scraper device and the pulley.

6. Apparatus as set forth in claim 5, wherein the traversing means comprises a bearing block that is mounted on the main frame to move in said traversing direction, and pivotally carries said pulley, and a rotatable screw-threaded spindle that is journalled on the main frame is arranged to traverse the bearing block.

7. Apparatus as set forth in claim 5, wherein the traversing means comprises a bearing block that is movable on the main frame in said direction, and pivotally carries said pulley, and a motor-driven member arranged to traverse the said bearing block in the traversing direction.

8. Apparatus of the character described for use in loading wheeled vehicles with fragmentary material, comprising in combination a main frame arranged to travel along a ground track, an upper rail track that is arranged to lie above the ground track, and has end portions constituting ramps that slope downwards to bear on rails on the ground track, and means of the drag-scraper type for loading vehicles situated on the upper track with fragmentary material, which means comprises a loading ramp that is pivotally mounted on the main frame to move vertically and horizontally in relation thereto, power-operated means for actuating the drag-scraper means, and power-operated means for lifting and lowering the loading ramp, both of which power-operated means are mounted on the main frame and form a unitary structure therewith.

9. Apparatus of the character described for use in loading wheeled vehicles with fragmentary material, comprising in combination a main frame arranged to travel along a ground track having three rails, an upper rail track that is arranged to lie above a pair of rails of the ground track, and has end portions constituting ramps that slope downwards for bearing on the said pair of rails, and means carried by the main frame for use in loading vehicles situated on the upper track with fragmentary material, which frame has wheels arranged to travel on one of the said pair of rails on the ground track, and on a third rail on the ground track.

10. Apparatus of the character described for use in loading wheeled vehicles with fragmentary material, comprising in combination a main frame arranged to travel along a ground track, a truck that is situated within the main frame and is arranged to run on the ground track, an upper rail track that is arranged to lie above the ground track, and has end portions constituting ramps that slope downwards to cooperate with rails on the ground track, a middle portion of which upper track is carried by said truck, and means of the drag-scraper type for loading fragmentary material into vehicles situated on the upper track.

HERBERT FREDERICK HENRY SHIELDS.